United States Patent [19]

Roffelsen

[11] Patent Number: 4,645,518
[45] Date of Patent: Feb. 24, 1987

[54] METHOD AND APPARATUS FOR REDUCING THE GAS CONTENT OF A LIQUID

[75] Inventor: Franciscus Roffelsen, Helmond, Netherlands

[73] Assignee: Spiro Research B.V., Helmond, Netherlands

[21] Appl. No.: 737,171

[22] Filed: May 23, 1985

[30] Foreign Application Priority Data

May 24, 1984 [DE] Fed. Rep. of Germany ....... 3419305

[51] Int. Cl.$^4$ .............................................. B01D 19/00
[52] U.S. Cl. ...................................... 55/203; 55/409; 415/121 A
[58] Field of Search .................. 55/52, 202, 203, 408, 55/409; 415/53 R, 121 A, 169 R

[56] References Cited

U.S. PATENT DOCUMENTS

| 3,358,425 | 12/1967 | Burnham | 55/52 |
| 3,942,961 | 3/1976 | Holliday et al. | 55/203 |
| 4,273,562 | 6/1981 | Niskanen | 55/52 |
| 4,475,866 | 10/1984 | Kambe et al. | 415/170 R X |
| 4,516,987 | 5/1985 | Niggemann | 55/52 |

FOREIGN PATENT DOCUMENTS

| 1528895 | 7/1970 | Fed. Rep. of Germany . |
| 2305713 | 9/1973 | Fed. Rep. of Germany . |
| 1923826 | 6/1979 | Fed. Rep. of Germany . |

OTHER PUBLICATIONS

Application corresponding to DE-OS 32 08 998, Mar. 1982.

Primary Examiner—Charles Hart
Attorney, Agent, or Firm—Toren, McGeady and Goldberg

[57] ABSTRACT

In a method of reducing the gas content of a liquid in which the liquid is propelled, preferably in a closed circuit, by a centrifugal pump (1), an improved degasification capability is achieved by extracting a portion of the liquid from the suction side of the pump blades (5, 18) in the region of the impeller axis, preferably via a passage (20) extending through a hollow drive shaft (21) of the impeller (14), and conducting this portion of the liquid through a liquid stilling zone (55, 56) where fine gas bubbles are separated from the liquid. The degassed liquid is preferably returned to the liquid in the inlet pipe (15) upstream of the pump (1), where it is set in rotation by a helical member (10). The liquid extracted from the pump (1) may be sucked out by means of an auxiliary rotary pump (3), or it may be entrained by injecting a high speed stream through a venturi nozzle (39) housed by the impeller (14) coaxially with the hollow drive shaft (21). In this latter case the degassing of the liquid in the stilling zone (55, 56) may be assisted by an atomizer (44).

34 Claims, 14 Drawing Figures

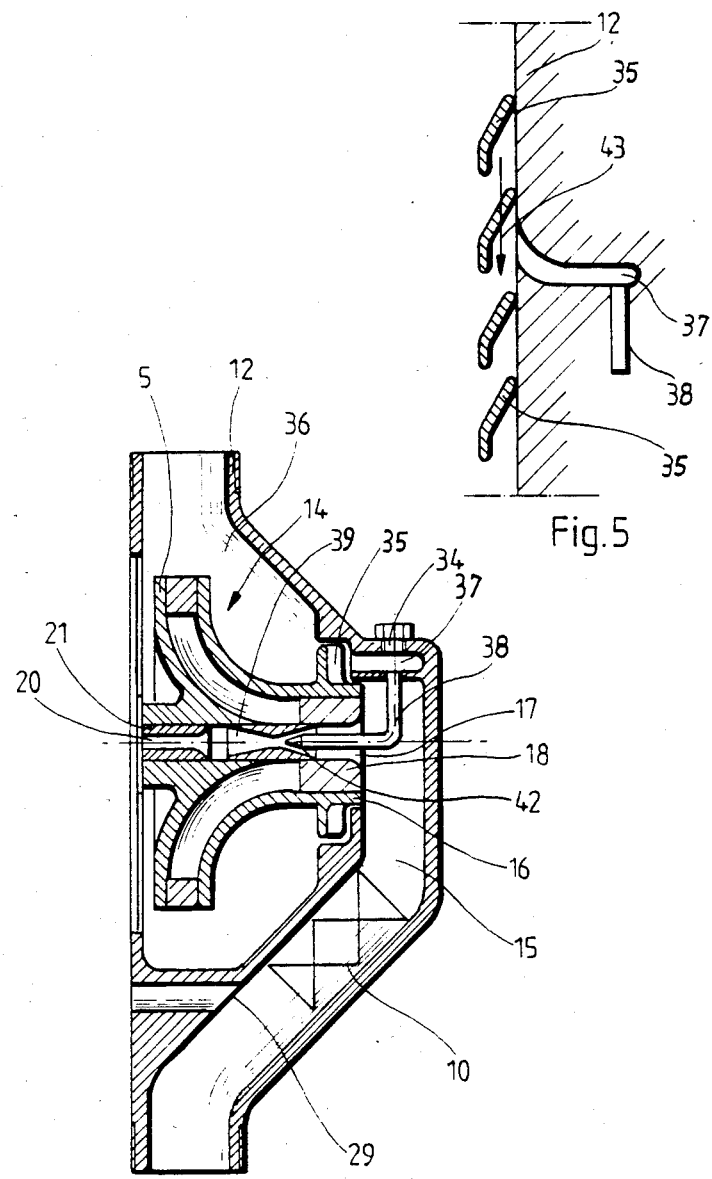

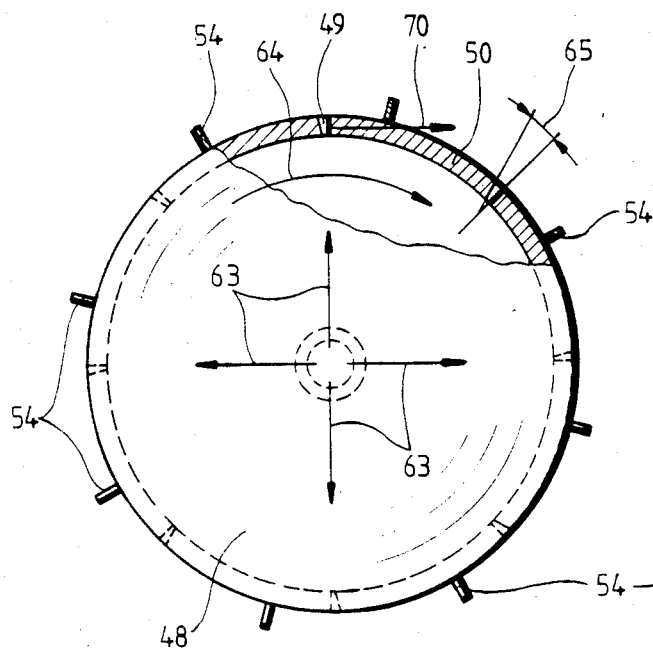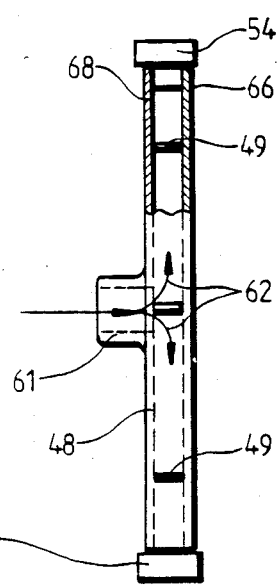
Fig. 11  Fig. 12
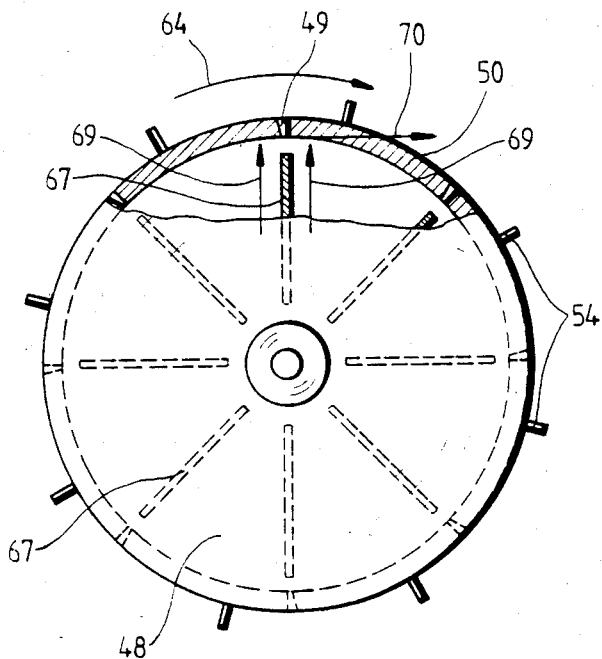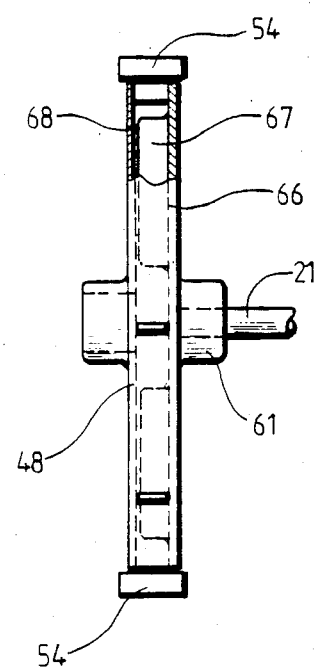
Fig. 13  Fig. 14

METHOD AND APPARATUS FOR REDUCING THE GAS CONTENT OF A LIQUID

This invention relates to a method of reducing the gas content of a liquid and to apparatus for carrying out the method.

It is well known that liquids are capable of dissolving gases up to a saturation point which depends upon the pressure and temperature conditions. Moreover, liquids can contain very small gas bubbles (microbubbles) having a diameter of approximately 10 to 20 microns which, like dissolved gases, cannot be detected by the naked eye and together with dissolved gases determine the gas content of a liquid. Liquids can also contain visible gas bubbles which, however, unlike dissolved gases and microbubbles, are seldom uniformly distributed in the liquid and tend to accumulate and rise rapidly in the liquid.

In many situations, especially in systems having a closed liquid circuit, gas accumulations in upwardly pointing pipe bends and comparable cavities are undesirable, but frequently unavoidable and it is usual to incorporate vent valves at such locations. Examples of such systems are central heating installations and fuel supply systems for diesel engines. As a rule, however, it is not sufficient just to vent the piping system conducting the liquid when it is first filled, because during normal operation of the system gas bubbles drawn in through leaks or introduced with fresh liquid, ascend in slowly flowing regions of the system and accumulate at the aforementioned, upwardly closed, blind cavities. Consequently the system must be deaerated or vented from time to time during operation also. In circuit systems having a variable liquid temperature, microbubbles form increasingly at the warmer locations.

Since the maintenance cost of venting is very high and checks must be carried out relatively frequently for reasons of safety, automatically operating venting systems have also been developed. For example, an automatically operating venting system for central heating installations is known from German Offenlegungsschrift No. 32 08 998, the venting system having a liquid stilling zone through which the liquid flows and in which even microbubbles ascend and can pass into a space above a free liquid surface for venting to atmosphere through an automatically operating valve. By the removal of microbubbles, the gas content of the liquid is so reduced that the dissolved quantity of gas falls appreciably below the saturation value, and the liquid becomes unsaturated. Unsaturated liquids are capable of absorbing gas from saturated or supersaturated liquids and can thereby break down gas cushions accumulated in a piping system. Such automatic deaerators operate all the more effectively, the more gas bubbles the liquid contains and the larger these bubbles are.

German Patent Specification No. 1 528 895 discloses a centrifugal pump for removing fairly large (i.e. generally visible) gas bubbles from highly viscous. slurry-like liquids. For this purpose the suction space of the pump is connected to the suction space of an auxiliary centrifugal pump by a throttle opening. The liquid stream flowing through the throttle is fed by the auxiliary pump back to the inlet side of the main pump, whereas gas bubbles which have entered the auxiliary pump via the throttle opening are sucked out of its centre by a vacuum pump. This system utilizes the known property of centrifugal pumps that relatively large gas bubbles accumulate in the core region of the pump impeller on account of their much lower density than the density of the liquid. This effect causes the liquid sucked through the throttle by the auxiliary pump to be considerably enriched with gas bubbles, and these gas bubbles to be so large that they can be sucked out of the core region of the impeller of the auxiliary pump without notable quantities of liquid. The suction power of the auxiliary pump must therefore be larger than the suction power of the vacuum pump for removing the gas bubbles. Such a system is, however, not capable of reducing the gas content of the liquid in the form of dissolved gases and microbubbles, since the difference in density between a liquid rich in microbubbles and a liquid poor in microbubbles is too small for removing the microbubbles by centrifugal separation from the liquid. Indeed, such a possibility is evidently not even contemplated in the German Patent specification, since in order to reduce the cavitation effect the liquid drawn into the auxiliary pump is sucked from the pressure-side edges of the blades of the impeller (see column 5, line 60 to column 6, line 12).

German Offenlegungsschrift No. 2 305 713 discloses a rotary pump with a degassing apparatus wherein a partial quantity of the pumped liquid is conducted in a feed-back circuit from the pressure side of the pump through a gas separating zone to the suction side of the pump. With such an arrangement, however, it is not possible to remove bubbles (microbubbles) forming in the liquid at reduced pressure in the pump, because these bubbles implode again under the pressure occurring on the delivery side of the pump. Moreover, a high speed of the liquid circulating in the degassing chamber prevents ascent of the microbubbles, which thus remain in the liquid and highly enrich the latter with air. The high degree of saturation of the liquid thus prevents absorption of further gas from gas cushions.

The aim of the invention therefore is to provide a method and an apparatus having an improved degasification capability for liquids, and according to one aspect of the invention a method of reducing the gas content of a liquid comprises propelling the liquid by a rotary pump, extracting a portion of the liquid from the suction side of the pump blades, and conducting the extracted portion of the liquid through a liquid stilling zone where fine gas bubbles are separated from the liquid.

The invention is based upon the concept of producing, in a liquid stream, a very large number of fine gas bubbles (of approximately the size of the aforementioned microbubbles), removing a portion of the liquid stream enriched with the microbubbles from the low pressure side of the rotary pump blades, and thereafter freeing the microbubbles from the removed stream by means of a liquid stilling zone, which may be of a known form. The invention makes use of the normally undesired cavitation effect on the low-pressure side of flow profiles, where so-called cavitation nuclei, e.g. in the form of impurities suspended in the liquid, produce microbubbles which rapidly increase in size. These microbubbles have proved to be extremely sluggish in movement with respect to the liquid. For example, they cannot be rapidly expelled from the liquid, like larger bubbles, but are entrained by the liquid stream.

From scientific investigations it is known that cavitation bubbles, on leaving the suction side of the profile over which they have flowed, collapse on account of the enforced rise in pressure with condensation of the liquid vapour, and thus produce the known rustling noise of cavitation. All the more surprising was it to find that the cavitation bubbles can be concentrated by utilizing their sluggishness in the liquid, can be extracted from the main liquid flow in a divisional stream, and can be removed from the divisional stream in a downstream liquid stilling zone, without previously collapsing.

By means of the method in accordance with the invention, a considerably more effective reduction in the gas content of liquids can be achieved than with the methods which were previously known, because the number and size of the microbubbles that can be separated in the liquid stilling zone is considerably increased by the creation and concentration of such bubbles in the centre of the propelled stream, and the collection and retention of the bubbles in the extracted stream. In addition, a contribution is made by the completely new finding, attested by scientific investigations, that at high rotational speeds of the rotary pump, for example in the region of 2,800 rpm., very short pressure shocks or impacts lasting in the region of microseconds are produced, resulting in an abrupt drop in pressure which, on the shadow side, i.e. immediately behind the blades of the pump, creates an almost absolute vacuum and leads to a very brief boiling phenomenon in the water.

The abrupt pressure drop, resulting from the motoring capability of the pump, increases the microbubble content of the liquid at the entry into the extraction passage by a factor of several times, and can be influenced, not only by the motor or pump output, but also, for instance, by the number, dimensions, and arrangement of the blades on the pump impeller. The microbubbles thus increasingly released in the liquid behind the pump are separated from the extracted liquid in the stilling zone, thereby very rapidly reducing the air content in the extracted liquid and, if this is conducted in a closed system back into the main stream supplied to the pump, also decreasing the gas concentration in the entire circulating system, until a minimum value is reached. The liquid in the system then no longer contains any free air and is unsaturated and therefore capable of absorbing gases and gas cushions in the system.

The extracted liquid stream may either be sucked into the stilling zone or injected into it.

A liquid flowing in a closed circuit is degassed particularly effectively by the method in accordance with the invention, because even the main liquid stream leaving the rotary pump has a considerably lower gas content than the incoming liquid, so that, at least after a few circulations, the liquid in the circuit is unsaturated and therefore capable of absorbing leakage gases and gas pockets in the regions of higher liquid temperatures.

The degassing capability can be still further considerably increased if the extracted liquid, after passing through the liquid stilling zone, is fed back into the liquid upstream of the rotary pump. In this way microbubbles not separated in the liquid stilling zone contribute to increasing the size of microbubbles already present in the liquid upstream of the rotary pump, so that the latter can subsequently be more easily separated. It is, of course, also possible to use the liquid from the liquid stilling zone directly in processes which require unsaturated liquids.

The separation of a liquid stream rich in microbubbles from the liquid propelled by the rotary pump may be improved by setting the liquid in a helical rotation before reaching the rotary pump. As a result, the microbubbles accumulate in the centre of the propelled liquid flow and remain there even if the flow passes through pronounced curves. Since such a concentration of mircobubbles has been detected also at the centre of the impeller of a rotary pump, the portion of liquid extracted from the rotary pump is preferably taken from the centre of the impeller.

As already mentioned, the extracted liquid may be sucked from the pump, or it may be extracted by an injector stream propelled from the outer periphery of the impeller of the rotary pump, via a bypass line, through the centre of the impeller at high speed. The injector stream entrains a liquid and gas mixture from the suction side of the pump in the region around the impeller axis and injects the mixture into the liquid stilling zone.

According to another aspect of the invention, apparatus for carrying out the method in accordance with the invention comprises a rotary pump having a bladed rotor, inlet and outlet pipes for conducting liquid to and from the pump, a passage opening into the region of the rotor axis for extracting aportion of the liquid from the suction side of the pump, and a liquid stilling zone for receiving and degassing the portion of the liquid extracted via the passage.

By opening in the region of the rotor axis the entrance to the extraction passage is therefore situated in the region of the pump in which the propelled fluid is subjected to the least centrifugal force. The pump inlet pipe preferably also leads into the region of the impeller axis, because the suction pressure then required in the extraction passage is less than the suction pressure of the rotary pump, and therefore is sufficiently low to suck considerable quantities of liquid out of the suction pressure range of the pump blades together with the maximum number of microbubbles which originate there and increase in size upon entry into the passage due to the pressure drop.

The degassed liquid is preferably conducted back into the liquid upstream of the rotary pump by means of a return duct leading from the stilling zone to the pump inlet pipe. In this case the return duct may advantageously lead into a constricted region of the inlet pipe, since this will cause a suction effect upon the degassed liquid in the return duct. This suction effect, in favourable cases, may be sufficient to suck the extracted liquid portion out of the rotary pump.

With regard to increasing the concentration of microbubbles in the portion of liquid extracted from the rotary pump, a rotor which possesses an axial suction portion communicating with the inlet pipe has proved very effective, especially when this suction portion carries radially inwardly oriented blades which, as the rotor rotates, produce considerable pressure surges and even temporarily cause the water to boil.

Preferably the rotor is mounted on a hollow drive shaft, and the passage through which the liquid portion is extracted from the rotary pump extends through the hollow drive shaft.

In one form of the apparatus there is an auxiliary rotary pump which is driven coaxially with the rotor to suck the extracted portion of liquid through the passage and deliver it to the stilling zone, the rotor of the auxiliary pump having a larger diameter than the rotor of the primary pump. In the case where the drive shaft is hollow, the central suction region of the auxiliary rotary pump thus communicates directly with that of the primary pump.

The extracted liquid stream, in which the concentration of microbubbles is still further increased by the auxiliary rotary pump, preferably leaves the auxiliary pump by a peripheral outlet opening to the liquid collecting region of the liquid stilling zone. In consequence, the distribution of the microbubbles in the liquid stream leaving the auxiliary rotary pump is comparatively homogeneous. If, however, and this tends to occur especially during starting-up of the main rotary pump, gas bubbles larger than microbubbles are sucked in by the auxiliary pump, a gas pocket inevitably forms in the upper region of the auxiliary pump casing, and preferably the auxiliary pump therefore has an upper outlet opening to a gas collecting space of the liquid stilling zone. This upper outlet may be provided with an adjustable throttle having a predetermined minimum leakage rate, and the stilling zone may have a droplet separator and deflector below the upper outlet for protecting sensitive mechanical components in the liquid stilling zone, i.e. the automatic venting valve mechanism.

In another form of the apparatus in accordance with this invention the extraction passage opens into an axial chamber of the rotor which contains a venturi nozzle, and the apparatus comprises a feed pipe which has an injection nozzle directed towards the venturi nozzle and which is connected to a bypass duct in the pump casing, and auxiliary blades disposed on the outside of the rotor and arranged to force liquid from the region around the rotor through the bypass duct and the feed pipe to the injection nozzle so that a stream of liquid is injected through the venturi nozzle to entrain and thereby extract the portion of the liquid from the suction side of the pump.

With this arrangement an auxiliary rotary pump with impeller is unnecessary, and the release of gases can be achieved very much more rapidly. A sudden pressure drop, causing release of gas, takes place in the extracted stream between the venturi nozzle and the injection nozzle of the feed pipe, and a further quantity of gas in solution is released in the vacuum zone of the venturi nozzle. Also, in the rotating venturi chamber, centrifugal force causes a further centering of the gas bubbles, which are thus supplied centrally to the extraction passage, which preferably extends through the drive shaft.

The releasing of microbubbles can be still further intensified by obliquely mounting the auxiliary blades on the impeller. By this means, not only is the peripheral speed in the extracted stream increased, but also the discharge speed of the injector stream from the injection nozzle of the feed pipe is increased, so that a higher mass acceleration is achieved which, in turn, strengthens the vacuum in the venturi nozzle further downstream. A higher discharge speed furthermore improves the entraining effect of the injector stream on the liquid portion drawn out of the suction pipe of the impeller. Depending upon the number of auxiliary blades, high-frequency injection pulses can be generated as a function of the motor speed, which further improve the venturi effect and virtually eliminate fouling of the feed lines. The injector stream is drawn from the pressure chamber in the region of the outlet pipe of the rotary pump into the bypass line, so that the high pressure existing in the pressure chamber promotes the intensity of the pulses generated by the auxiliary blades. The auxiliary blades improve the acceleration of the injector stream, although the pressure difference existing between the outlet and inlet sides of the pump is itself sufficient for forcing a liquid stream from the outlet pressure chamber into the bypass line.

The liquid stilling zone, which is located in the interior of a degassing housing attached to the pump motor casing, comprises a liquid collecting zone and a gas collecting zone for separating the liquid and gaseous components of the extracted liquid which is supplied thereto, and in the above injection form of the apparatus the liquid may be supplied to an atomizing device which is disposed in the gas space and which comprises a liquid distributor mounted on the hollow drive shaft of the rotary pump to receive the liquid from the passage therethrough, and baffle plates positioned in a radial plane around the distributor. The liquid distributor is preferably in communication with the passage through the hollow drive shaft by means of peripheral apertures in the drive shaft, and the hollow drive shaft is closed at the end. As the drive shaft rotates, the liquid flows by centrifugal force outwards, guided by the distributor, and upon emerging into the gas space impinges in rapid succession on the baffle plates, of which there are a large number disposed as close as possible to the periphery of the distributor at intervals around it. The liquid emerging from the distributor is atomised by the impact on the stationary baffle plates, and is thus converted into a liquid mist which no longer allows any space for microbubbles.

In contrast to known liquid stilling zones having a liquid-filled collecting space of large volume, the gas space of the stilling zone of this form of the apparatus is several times larger than the liquid collecting space. The liquid surface lies in a plane below the circulating path of the liquid distributor so that, on one hand the gas components of the liquid mist can ascend and be discharged from the top of the housing via a valve regulated by a float on the liquid, and on the other hand the liquid constituents can fall into the liquid collected at the bottom of the housing for return to the liquid circulating system.

The liquid distributor may comprise a plurality of U-shaped channels which are disposed radially around the periphery of the drive shaft and which have widened-out or flattened zones at their outer ends. With this arrangement the liquid emerges across the width of the widened-out or flattened zone as a thin film, which favours the removal of the microbubbles. The thinner the film of the emerging water, the greater the efficiency that may be expected in the removal of these bubbles.

As a further alternative, the liquid distributor may comprise a cylindrical casing having transverse slits in its circumferential wall, this arrangement also achieving a thin liquid film discharge. With slits preferably diverging from the inside of the casing, e.g. having a conical angle of approximately 15°, the liquid centrifuged out of the interior of the casing through the slits can be depressurized.

In order that the acceleration of the liquid on entry into the slits may be optimized, the cylindrical casing may be constructed with a stationary end wall on which radially extending guide plates are mounted.

However, in order to make possible a desired stilling of the atomized liquid microbubbles mixture and to increase the time of ascent of the microbubbles in the collected liquid, the invisible small bubbles in particular ascending relatively slowly, it is preferable to use the known form of stilling zone in which the liquid collecting space is of larger volume than the gas space above it (as in the examples shown in FIGS. 2 and 3). In this case, the atomizing device is preferably located in a baffle space in the degassing housing separated by a partition from the liquid stilling zone, the baffle space connecting via an opening in the partition with the liquid collecting space of the stilling zone. With this arrangement, possible turbulences which can arise with the sudden impact of the liquid on the baffle plates do not endanger the stilling of the mixture in the stilling zone. Instead, the baffle space is filled with the atomized liquid, which contains a large number of released microbubbles so that the mixture assumes a milky appearance. After the mixture enters the stilling zone, any movement or turbulence is retarded by the liquid region, possibly supported by wires disposed therein, and the small bubbles can ascend slowly into the gas space. In order that the atomized mixture can enter positively into the liquid collecting zone, guide plates may be disposed in the liquid zone at a distance from the opening. The guide plates additionally provide a preliminary stilling effect on the mixture.

The atomizing device may in fact be located in a baffle space separated from the liquid stilling zone in this manner, irrespective of the type of degasser stilling zone which is used.

Examples of the method and apparatus in accordance with the invention will now be described with reference to the accompanying drawings, in which:

FIG. 4 is a sectional view of a portion of the apparatus shown in FIG. 3, but illustrating a modified version thereof;

FIG. 5 is a developed sectional view illustrating schematically a portion of the apparatus shown in FIG. 4;

FIG. 11 is a front view, partly in section, of an example of the portion of the apparatus shown in FIG. 10;

FIG. 12 is a side view, partly in section, of the example shown in FIG. 11;

FIG. 13 is a view similar to that of FIG. 11, but showing another example of the portion of the apparatus; and, FIG. 14 is a side view, partly in section, of the example shown in FIG. 13.

Figure 1:
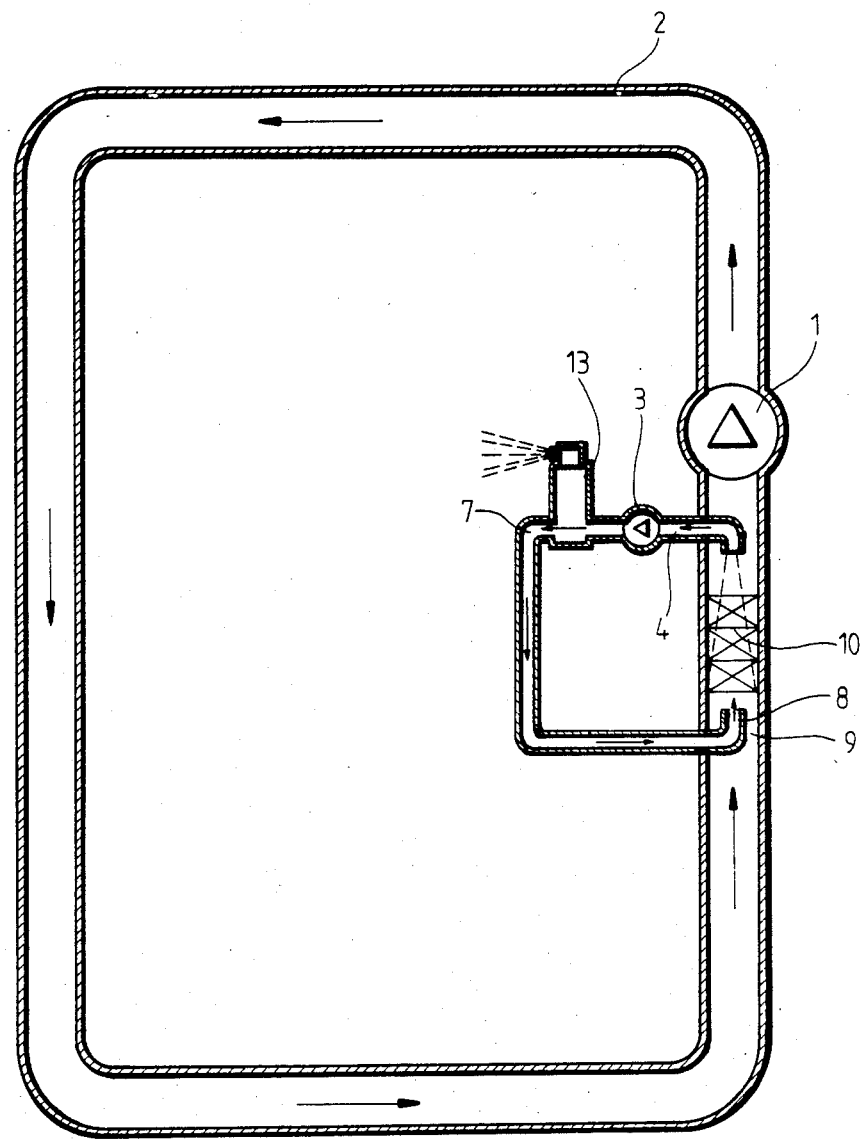
FIG. 1 is a schematic diagram illustrating the operation of one form of apparatus in carrying out the method in accordance with the invention.

FIG. 1 shows a closed circuit pipe system 2 having a rotary pump 1 for circulating liquid around the system 2, and an axuliary rotary pump 3 which is arranged to suck, via a suction line 4, a stream of the liquid from the suction side of the pump 1 and deliver it to a liquid stilling zone 6. An outlet line 7 from the stilling zone 6 leads back into the system 2 upstream of the rotary pump 1, the mouth 8 of the outlet line 7 being oriented centrally and parallel to the flow direction and creating a constricted region 9 in the pipe system 2 having approximately the form of a venturi nozzle. A helical metal sheet 10 is located in the pipe system 2 upstream of the rotary pump 1 and causes the flowing liquid to rotate so that gas bubbles contained in the liquid become concentrated in the central region of the liquid stream.

Figure 2:
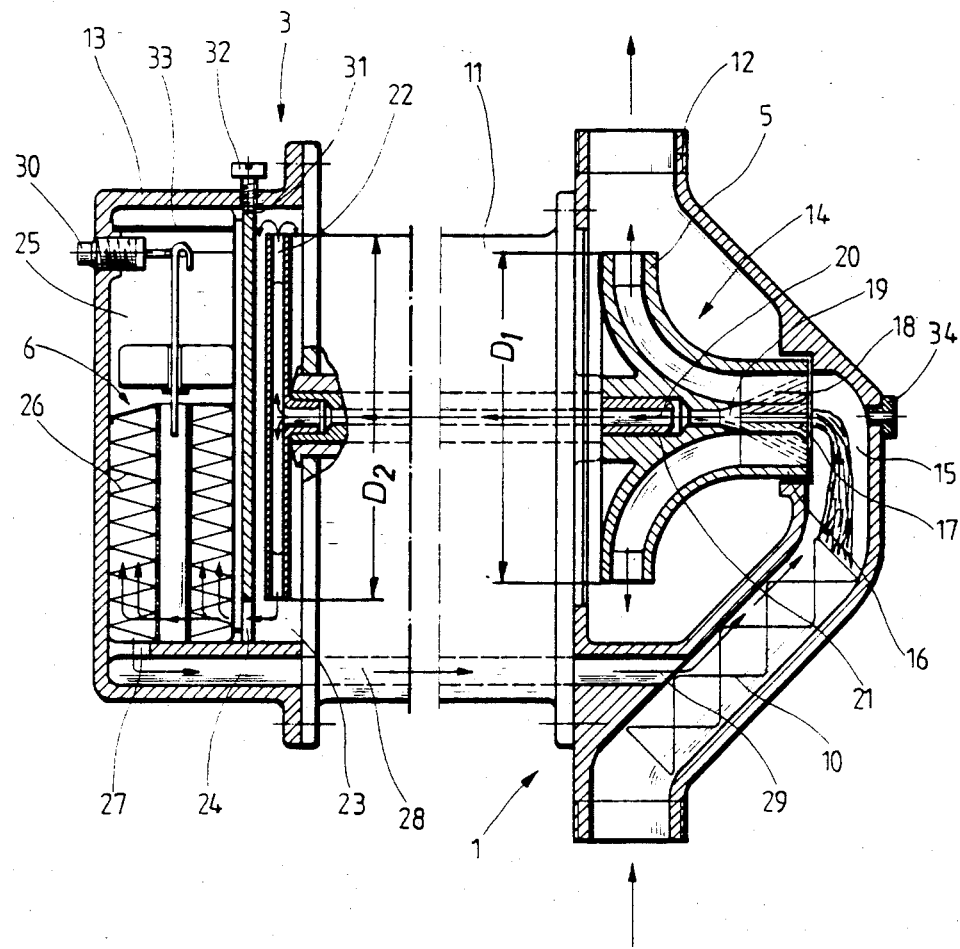
FIG. 2 is a side view, partly in section, of a particular example of the form of apparatus shown in FIG. 1.

In the example of the apparatus in accordance with the invention shown in FIG. 2, the rotary pump 1 has a pump casing 12 flange-fitted to one end of a motor casing 11, and a degasser housing 13 flange-fitted to the opposite end of the casing 11. The pump casing 12 houses an impeller 14 having blades 5 which possess a pressure and a suction side and which produce, as the impeller revolves, a suction in an inlet pipe 15 whereby a liquid stream is sucked into the pump casing. The impeller 14 possesses an axially oriented suction pipe 16 having an end opening 17 for liquid entry from the inlet pipe 15, and carries, on the inner wall of the pipe 16 radially inwardly oriented pump blades 18 which possess a pressure side and a suction side in a similar manner to the blades 5.

In operation, small gas bubbles situated in the liquid stream and forming on the pump blades 18 accumulate spontaneously in the core zone of the impeller 14 near to its axis, and are drawn via a central bore 19 of the impeller 14 into the core 20 of a hollow drive shaft 21 which extends through the motor housing 11 and carries at its opposite end an impeller 22 of the auxiliary rotary pump 3. The impeller 22 is disposed in the degasser housing 13 and is charged centrally, via the core 20 of the drive shaft 21, with the liquid stream sucked from the core zone of the rotary pump 1. This stream is centrifuged radially outwards along the blades of the impeller 22, and further microbubbles are produced at the suction side of the blades. The diameter D2 of the impeller 22 is larger than the diameter D1 of the impeller 14, so that a sufficiently high suction is generated in the core zone of the suction pipe 16 of the main rotary pump 1.

A radial pressure chamber 23 of the auxiliary rotary pump 3 communicates, via a connecting opening 24, with the inlet region of the liquid stilling zone 6 which is also located in the degasser housing 13, and which has a gas space 25 above it inside the housing 13 as known for example from German Offenlegungsschrift No. 32 08 998. As known, spirally wound wires 26 in the stilling zone 6 keep the liquid at rest.

The liquid delivered by the auxiliary rotary pump 3 leaves the liquid stilling zone 6 via a bottom opening 27 and passes into an outlet line 28 leading internally from the degasser housing 13 through the motor housing 11 and into the pump casing 1. The outlet line 28 delivers the liquid through an outlet 29 back into the liquid main stream in the main pump inlet pipe 15, wherein the stream is set in a rapidly spiralling motion in the region of the outlet 29 by the helically wound metal sheet 10 which is located in the pipe 15.

In this manner, a special liquid circuit is created inside the apparatus, in which microbubles are released at the suction sides of the main and auxiliary pumps 1 and 3, these microbubles are separated from the liquid inside the liquid stilling zone 6, and the liquid is supplied back into the inlet pipe 15 leading to the main pump. The gas bubbles ascending in the liquid stilling zone 6 into the gas space 25 are released into the atmosphere via an automatically operative discharge valve 30.

During starting-up of the apparatus, the larger gas bubbles entering the inlet pipe 15 of the rotary pump 1 pass into the auxiliary rotary pump 3, where they have an adverse effect upon the functioning of the pump. An upper connecting opening 31 is therefore provided leading from the pressure chamber 23 of the auxiliary rotary pump 3 into the gas space 25 of the liquid stilling zone 6. The flow cross-section of the connecting opening 31 is regulated by an adjusting screw 32.

After the larger quantities of gas have been conducted out of the auxiliary rotary pump 3, the corss-section of the connecting opening 31 is reduced so far that only a very small residual opening for possible later gas leakages remains. A U-shaped, bent metal sheet 33 is positioned over the discharge valve 30 in the manner of a droplet deflector and protects the valve 30 from fouling. The screw 32 can be so adjusted that a relatively small, permanent residual opening 31 remains between the pressure chamber 23 and the gas space 25, and large gas bubbles will rapidly flow through. Gas-containing water normally continuously flows through this opening 31 and drips onto the deflector plate 33, and thence into the completely still zone 6. In this manner microbubbles entering the gas space 25 via the opening 31 will be conducted away via the valve 30 in the same way as the bubbles entering via the connecting opening 24.

The bore 19 of the impeller 14 and the core 20 of the drive shaft 21 are accessible for cleaning purposes via a co-axial inspection opening 34, protected for example by a rubber membrane, in the casing 12 of the rotary pump 1.

Figure 3:
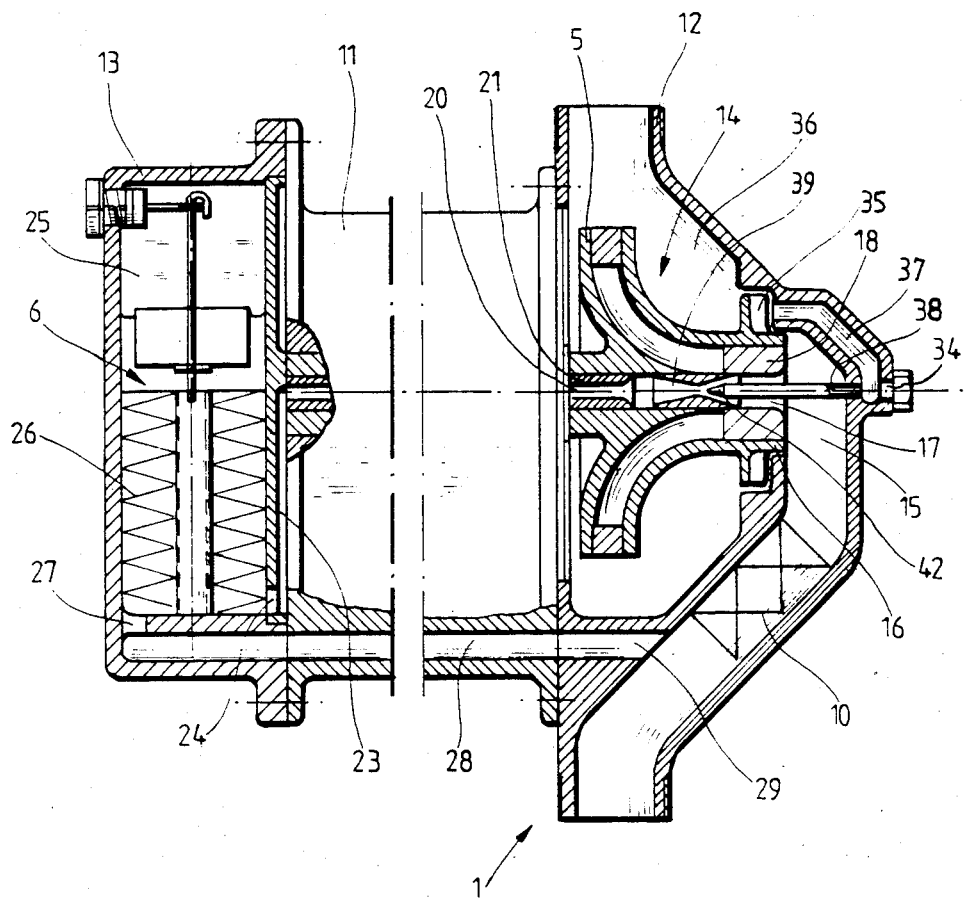
FIG. 3 is a view similar to that of FIG. 2, but showing an example of a different form of the apparatus.

The apparatus illustrated in FIG. 3 is similar in construction and operation to that described above with reference to FIG. 2, except in regard to the manner of removing the liquid stream from the main pump 1 for degassing and, in particular, there is no auxiliary rotary pump for generating further microbubbles. The rotor 14 of the main pump 1 possesses, in addition to the main pump blades 5, a plurality of auxiliary blades 35 on the outside of the suction pipe portion 16 of the rotor 14. A bypass line 37 in the upper part of the pump casing 12 bounding the outlet pressure chamber 36 of the pump 1 is associated with the blades 35, and communicates with a feed pipe 38 which projects axially through the end opening 17 of the suction pipe 16 and terminates with an injection nozzle 42 in front of an axial chamber of the rotor constructed as a venturi nozzle 39.

As the rotor 14 revolves, the auxiliary blades 35 drive a stream of liquid at high pressure from the pressure chamber 36 into the bypass line 37. The liquid flows at high speed through the bypass line 37 and the feed pipe 38, and is injected from the injection nozzle 42 through the venturi nozzle or chamber 39, creating an injection effect whereby a mixture of liquid and gas is entrained out of the pipe 16 and drawn through the venturi nozzle 39. The liquid passes through the core 20 of the hollow drive shaft 21 into an outlet duct 23 which is disposed in the degasser housing 13 adjacent the motor housing 11 and which is connected via a communicating opening 24 with the inlet region of the liquid stilling zone 6.

Since behind the venturi nozzle 39, not only a high temperature in the stream drawn from the pump but also a certain negative pressure exists, the bubbles released in the venturi nozzle no longer go into solution and, if they are not captured in the gas space 25 of the liquid stilling zone 6, are immediately conducted via the bottom opening 27 and the outlet line 28 back to the pump inlet pipe 15, and thus back into the closed circuit.

A modified form of the cast pump casing 12 is illustrated in FIG. 4. In this case, the bypass line 37 is constructed as a horizontal cored hole extending in the casing wall parallel to and above the rotor axis. The feed pipe 38 is cranked through a right angle and carries the injector stream from above through a vertical pipe length and, after the bend, through a horizontal pipe length to the injector nozzle 42. The right-angled feed pipe 38 is preferably connected to the bypass line 37 in such a way that its vertical pipe length penetrates from above centrally into the inlet pipe 15, so that the feed pipe 38 only partly crosses the liquid stream flowing in the inlet pipe 15 and into the suction pipe 16. The free microbubbles already driven into the core of the suction pipe 16 can settle around the feed pipe 38, be entrained by the suction of the liquid emerging at high speed from the injection nozzle 42 and thereby injected into the venturi nozzle 39.

FIG. 5 shows schematically a plurality of auxiliary blades 35, which move past the bypass line 37 in the direction of arrow 43 as the rotor revolves. A gradually increasing pressure builds up below each auxiliary blade 35 as the rotor revolves, the pressure being largely relieved as the auxiliary blade 35 reaches the bypass line 37 and drives a stream of liquid into the line 37. The injector stream then flows at high speed through the lines 37 and 38 to emerge at high speed from the nozzle 42 (FIGS. 3 and 4). The frequency of pulses generated in this manner depends not only upon the motor speed of the pump but also upon the number of auxiliary blades 35.

Figure 6:
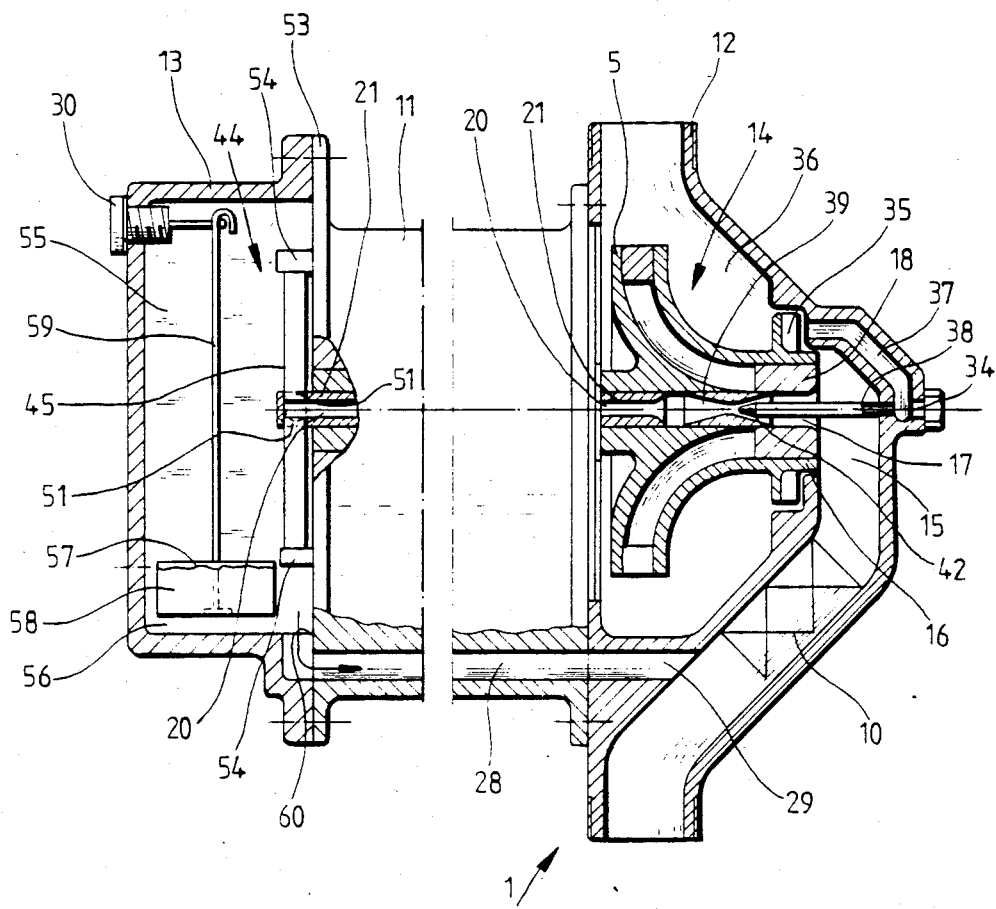
FIG. 6 is a view similar to that of FIG. 3 but showing another example of the apparatus.
Figure 8:
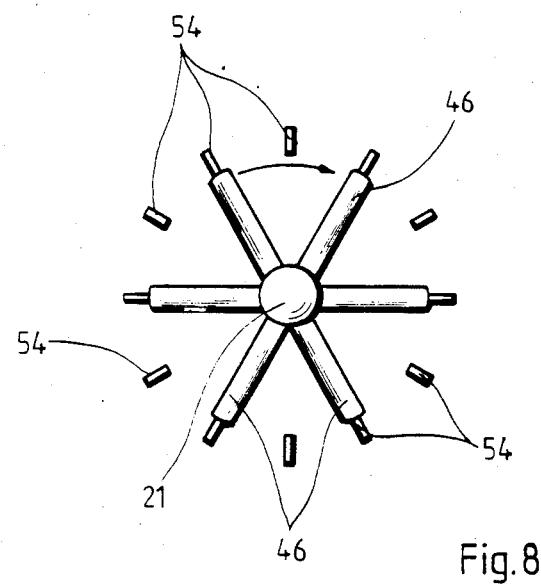
FIG. 8 is a schematic front view of a portion of the apparatus shown in FIG. 6.
Figure 9:
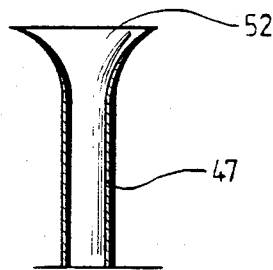
FIG. 9 is a view illustrating an alternative construction for a component of the portion of the apparatus shown in FIG. 8.
Figure 10:
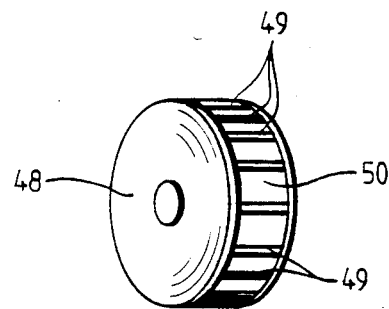
FIG. 10 is a schematic perspective view showing an alternative form of the portion of the apparatus shown in FIG. 8.

The apparatus illustrated in FIG. 6 is the same as that in FIG. 3 except in the region of the degasser housing 13. In this case the liquid delivered through the hollow drive shaft 21 is delivered to an atomizing device 44 in the housing 13. The device 44 comprises a liquid distributor 45 which, as shown in FIG. 8, may consist of a plurality of slender pipes 46 disposed radially around the periphery of the drive shaft 21, or may instead consist of similarly arranged U-shaped pipes 47 of the form illustrated in FIG. 9. Alternatively, the distributor 45 may comprise a disc casing 48 having transverse slits 49 in the outer cylindrical wall 50 as illustrated in FIG. 10.

The hollow core 20 of the drive shaft 21 communicates via apertures 41 with the liquid distributor 45 so that, as the drive shaft 21 revolves, the liquid from the core 20 passes, due to centrifugal force, into the distributor 45. Whereas the liquid emerges as droplets in the case of a distributor 45 comprising slender pipes 46 as shown in FIG. 8, both the transverse slits 49 of the disc distributor of FIG. 10, which optionally also may be a closed rotor, and also the U-shaped pipe distributor of FIG. 9, produce a thin liquid film, for which purpose the U-shaped pipes 47 possess, at their head end (i.e. the outlet end for the liquid) diverging or flattened zones 52.

A plurality of baffle plates 54 are fixed on the rear wall 53 of the motor housing 11 so that they are spaced from one another in a radial plane around the liquid distributor 45. The liquid centrifuged out of the liquid distributor 45, revolving at high speed, meets in rapid succession the baffle plates 54 which are mounted as near as possible to the outer periphery or head end of the liquid distributor 45, and is atomized by these baffle plates into extremely fine constituents so that the microbubbles previously contained by the liquid are shattered.

The form of disc casing 48 illustrated in FIGS. 11 and 12 has a hub 61 which is pushed onto the end of the drive shaft 21. The liquid enters the hollow space of the casing 48 from the hollow drive shaft 21 as indicated by the arrows 62, and becomes distributed as the casing revolves in the direction of the arrow 64 radially outwards, as illustrated by arrows 63 in FIG. 11, to the slits 49 distributed around the periphery 50. As it enters the slits, the liquid is subjected to a sudden acceleration, which produces a high negative pressure and causes temporary boiling of the liquid, causing numerous microbubbles to form. The liquid becomes depressurized in the slits 49, diverging outwardly at an angle 65 of approximately 15° as it is centrifuged out and before striking the baffle plates 54 which atomize the liquid and release the microbubbles.

In the form of casing 48 illustrated in FIGS. 13 and 14, the rear wall 6 of the casing, that is the wall nearest the motor housing 11, is fixed and possesses radially extending guide plates 67 mounted thereon, whereas the rest of the casing 68 revolves with the drive shaft 21. The guide plates 67 guide the liquid in the direction of the arrows 69 into the slits 49, wherein the liquid is subject to the action of a very high pressure drop and is accelerated tangentailly as indicated by the arrow 70.

The degasser housing 13 possesses a large degassing zone or air space 55 and a very much smaller liquid or water zone 56, as shown in FIG. 6. The degassing zone 55 must have a height corresponding at least to the diameter of the liquid distributor 45, including the baffle plates 54 arranged around it. The liquid surface 57 is kept in a constant position by a float 58 which co-operates with an outlet valve 30 via a linkage 59. The gaseous constituents of the liquid mist produced by the atomiser 44 are discharged to atmosphere via the automatic float operated discharge valve 30. The liquid constituents, in contrast, fall and accumulate in the liquid zone 56. The unsaturated liquid, i.e. liquid free of gas inclusions and thus capable of absorbing leakage gases and gas cushions still present in the circulating system, flows from the zone 56 via a bottom opening 60 of the degasser housing 13 into an outlet line 28 leading from the degasser housing through the motor housing 11 and into the pump casing 1. The liquid then passes via an outlet 29 back into the inlet pipe 15 of the rotary pump 1 where the main liquid stream is set in rapidly spiralling rotation in the region of the outlet 29 by the helical sheet 10 in the pipe 15.

Figure 7:
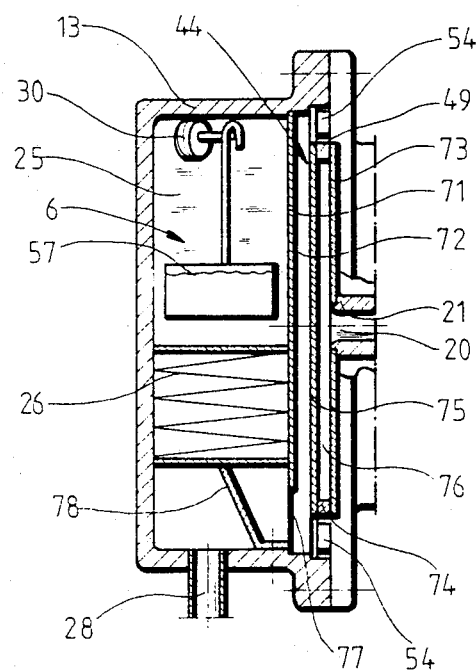
FIG. 7 is a part sectional view of a portion of the apparatus shown in FIG. 6 but illustrating a modified version thereof.

In the embodiment shown in FIG. 7, the liquid stilling zone 6 in the degasser housing 13 is separated by a partition 71 from a baffle space 72 which houses the atomizing device 44. The atomizing device 44 comprises a disc 73 which revolves with the drive shaft 21 and has a peripheral outer collar 74 including the transverse slits 49. The outer collar 74 extends towards the partition 71 and terminates in front of a stationary disc 75 to enclose a cavity 76 for the liquid flowing in via the passage 20 through the drive shaft 21. The baffle plates 54 are disposed on the stationary disc 75 around the collar 74. The baffle space 72 becomes filled with the atomized liquid mixture, which enters the liquid region of the stilling zone 6 via one or more openings 77 in the partition 71 and is guided therein by guide plates 78. The stilling zone 6 corresponds, in this example, to the known air separator illustrated in the examples of FIGS. 2 and 3.

I claim:
1. A method of reducing the gas content of a liquid comprising propelling the liquid by a rotary pump, producing fine gas bubbles by cavitation on the low-pressure side of the pump blades, extracting a portion of the liquid from the suction side of the pump blades, concentrating the fine gas bubbles in the center of the flow of the liquid, and conducting the extracted portion of the liquid through a liquid stilling zone where the fine gas bubbles are separated from the liquid.

2. A method according to claim 1 in which the extracted portion of the liquid is sucked into the stilling zone.

3. A method according to claim 1 in which the extracted portion of the liquid is injected into the stilling zone at high speed.

4. A method according to claim 1 in which the liquid propelled by the pump flows in a closed circuit.

5. A method according to claim 1 in which the extracted portion of the liquid is returned from the stilling zone to the liquid upstream of the rotary pump.

6. A method according to claim 1 in which the liquid is set in helical rotation upstream of the rotary pump.

7. A method according to claim 2 in which the extracted portion of the liquid is sucked through the center of the rotary pump.

8. A method according to claim 3 in which the extracted portion of the liquid is generated by an injection stream propelled from the outer periphery of the rotor of the rotary pump, via a bypass line, through the center of the rotor.

9. Apparatus for reducing the gas content of a liquid comprising a rotary pump having a bladed rotor, inlet and outlet pipes for conducting liquid to and from the pump, means for concentrating the bubbles formed by cavitation on the low-pressure side of the rotary pump in the center of the flow of the liquid upstream of the rotary pump, a passage opening into the region of the rotor axis for extracting a portion of the liquid from the suction side of the pump, and a liquid stilling zone for receiving and degassing the portion of the liquid extracted via the passage.

10. Apparatus for reducing the gas content of a liquid comprising a rotary pump consisting of a rotor equipped with pump blades and auxiliary blades, an inlet pipe and an outlet pipe, means for concentrating the bubbles formed by cavitation on the low-pressure side of the rotary pump in the center of the flow of the liquid upstream of the rotary pump, wherein the auxiliary blades are disposed on the rotor radially outwards in the region of the inlet pipe and are associated with a bypass line in the pump casing, which bypass line conducts an injection stream via a feed pipe with injection nozzle into a chamber of the rotor axis constituted as a venturi nozzle, and a liquid stilling zone disposed behind the suction line and having an outlet line for degassed liquid.

11. Apparatus according to claim 9 or 10 comprising a return duct leading from the stilling zone to the pump inlet pipe for conducting degassed liquid back into the liquid upstream of the pump.

12. Apparatus according to claim 9 in which the return duct leads into a constricted region of the inlet pipe.

13. Apparatus according to claim 9 or 10 in which the concentrating means is a helical member for rotating the liquid.

14. Apparatus according to claim 9 or 10 in which the rotor possesses an axial suction portion communicating with the inlet pipe.

15. Apparatus according to claim 14 in which the suction portion carries radially inwardly oriented pump blades.

16. Apparatus according to claim 9 or 10 in which the rotor is mounted on a hollow drive shaft and the passage extends through the hollow drive shaft.

17. Apparatus according to claim 9 or 10 in which the pump has a casing with an inspection opening disposed coaxially with the rotor axis on the suction side of the rotor.

18. Apparatus according to claim 9 comprising an auxiliary rotary pump which is driven coaxially with the rotor to suck the extracted portion of liquid through the passage and deliver it to the stilling zone, the rotor of the auxiliary pump having a larger diameter than the rotor of the primary pump.

19. Apparatus according to claim 18 in which the auxiliary pump has a lower outlet opening to a liquid collecting region of the liquid stilling zone.

20. Apparatus according to claim 18 or 19 in which the auxiliary pump has an upper outlet opening to a gas collecting space of the liquid stilling zone.

21. Apparatus according to claim 20 having a droplet deflector and separator in the liquid stilling zone below the upper outlet from the auxiliary pump.

22. Apparatus according to claim 10 in which the passage leads to an outlet opening to a liquid collecting region of the liquid stilling zone.

23. Apparatus according to claim 9 or 10 in which the auxiliary blades are disposed obliquely on the rotor.

24. Apparatus according to claim 9 including an atomizing device for atomizing the liquid which is delivered to the liquid stilling zone, the atomizing device comprising a liquid distributor mounted on the hollow drive shaft of the rotary pump to receive the liquid from the passage therethrough, and baffle plates positioned in a radial plane around the distributor.

25. Apparatus according to claim 10 including an atomizing device for atomizing the liquid which is delivered to the liquid stilling zone, the atomizing device comprising a liquid distributor mounted on the hollow drive shaft of the rotary pump to receive the liquid from the passage therethrough, and baffle plates positioned in a radial plane around the distributor.

26. Apparatus according to claim 24 or 25 in which the liquid distributor is in communication with the passage through the hollow drive shaft by means of peripheral apertures in the drive shaft.

27. Apparatus according to claim 24 or 25 in which the liquid distributor comprises a plurality of narrow tubes disposed radially around the periphery of the drive shaft.

28. Apparatus according to claim 24 or 25 in which the liquid distributor comprises a plurality of U-shaped channels which are disposed radially around the periphery of the drive shaft and which have widened-out or flattened zones at their outer ends.

29. Apparatus according to claim 24 or 25 in which the liquid distributor comprises a cylindrical casing having transverse slits in its circumferential wall.

30. Apparatus according to claim 29 in which the slits diverge from the inside of the casing.

31. Apparatus according to claim 30 in which the cylindrical casing possesses a stationary end wall on which radially extending guide plates are mounted.

32. Apparatus according to claim 24 or 25 in which the liquid stilling zone comprises a degassing space several times larger than its liquid collecting space, and the atomizer is disposed in the degassing space.

33. Apparatus according to claim 24 or 25 in which the atomizing device is disposed in a baffle space separated by a partition from the liquid stilling zone, and the baffle space is connected, via an opening in the partition, with the liquid collecting region of the stilling zone.

34. Apparatus according to claim 33 in which there are guide plates disposed in the liquid collecting region at a distance from the opening in the partition.

* * * * *